July 4, 1961  R. SCHMIDT  2,990,702
DEVICE FOR SETTING A PATTERN WHEEL
Filed Feb. 29, 1960  8 Sheets-Sheet 1

Inventor
Richard Schmidt
By Michael S. Striker
Attorney

July 4, 1961             R. SCHMIDT             2,990,702
DEVICE FOR SETTING A PATTERN WHEEL
Filed Feb. 29, 1960                            8 Sheets-Sheet 3
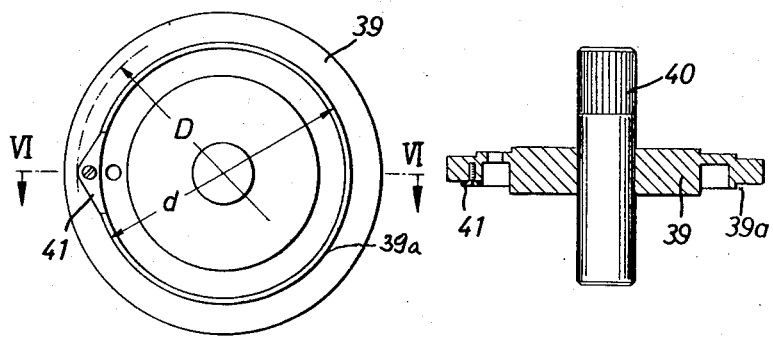
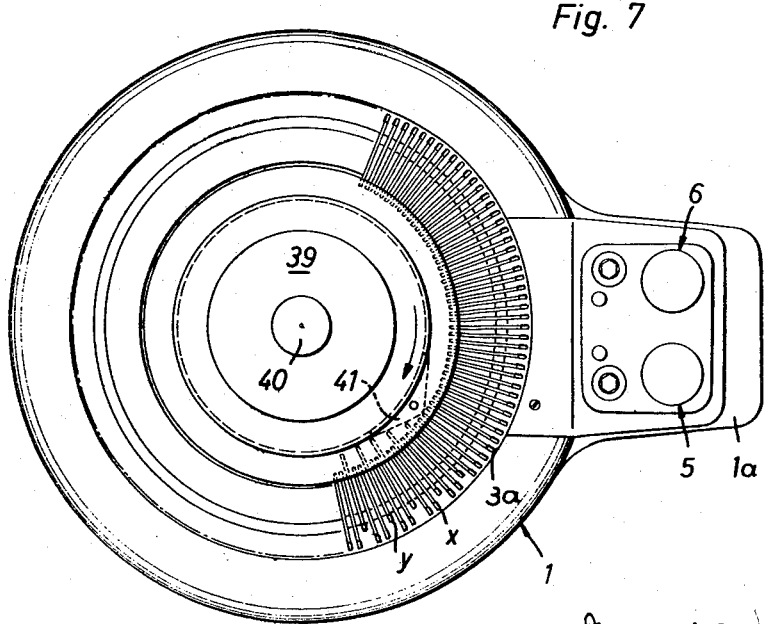

July 4, 1961   R. SCHMIDT   2,990,702
DEVICE FOR SETTING A PATTERN WHEEL
Filed Feb. 29, 1960   8 Sheets-Sheet 6

Inventor
Richard Schmidt
BY Michael S. Striker
Attorney

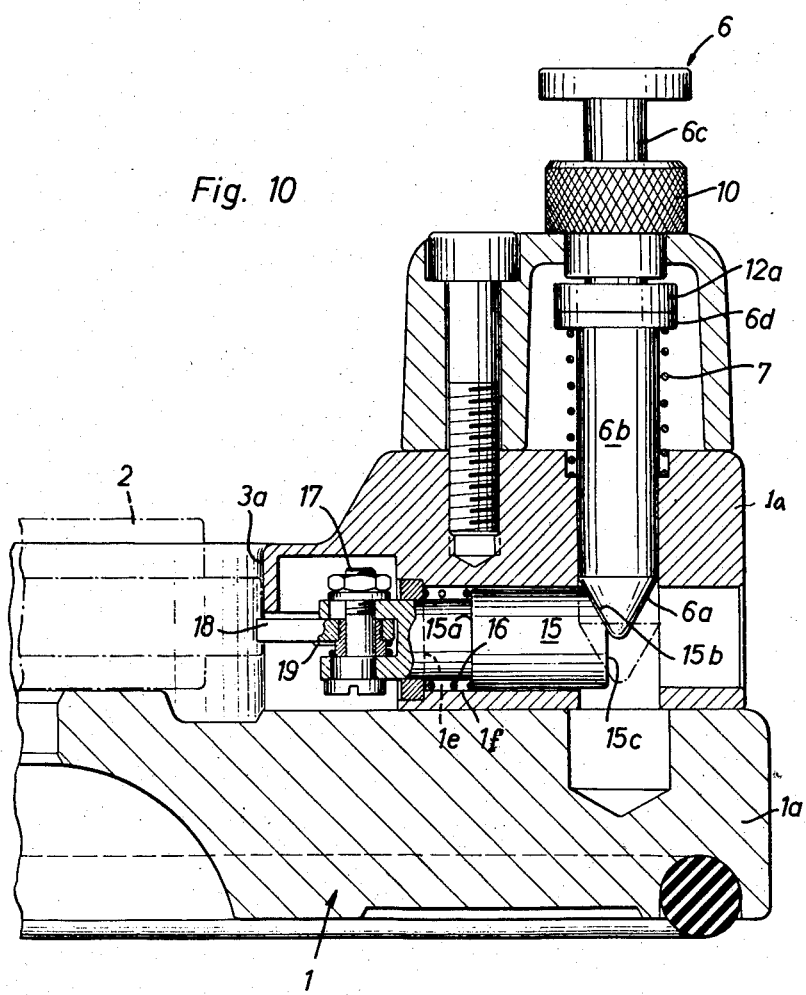

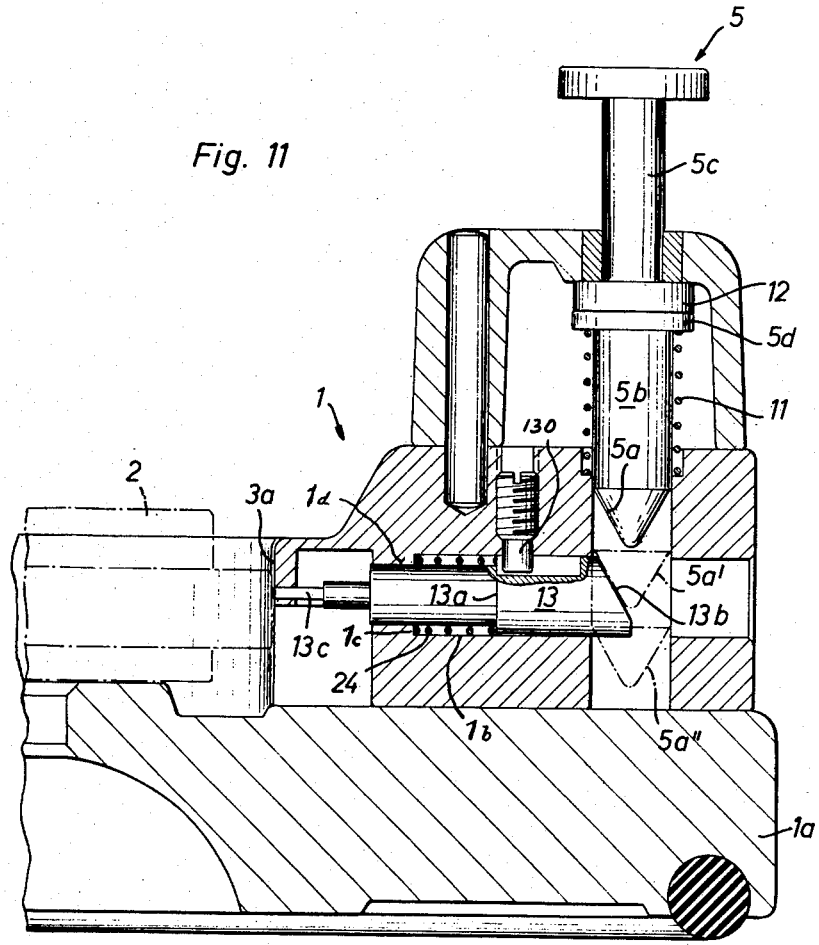

United States Patent Office 2,990,702
Patented July 4, 1961

2,990,702
DEVICE FOR SETTING A PATTERN WHEEL
Richard Schmidt, Stuttgart-Vaihingen, Germany, assignor to Franz Marat G.m.b.H., Stuttgart-Vaihingen, Germany
Filed Feb. 29, 1960, Ser. No. 11,505
Claims priority, application Germany Feb. 28, 1959
20 Claims. (Cl. 66—1)

The present invention relates to a device for setting the jacks of a pattern wheel of the type used in a circular knitting machine.

Pattern wheels of the type to which the present invention is applied have radial slots in which jacks are mounted for movement in radial direction between an outwardly advanced operative position, and an inwardly retracted inoperative position. In accordance with the prior art, the jacks are set by a manual operation in accordance with the desired pattern, whereupon they are clamped in set position in which selected jacks are in operative position, and other selected jacks are in the retracted inoperative position.

It is an object of the present invention to provide a device for rapidly setting the shiftable jacks of a pattern wheel in accordance with a desired pattern.

Another object of the present invention is to provide a device for shifting all jacks of a pattern wheel of this type to the outwardly advanced operative position, and then shift selected jacks to the retracted inoperative position in accordance with the desired pattern.

Another object of the present invention is to provide a device for setting the jacks of a pattern wheel which effects stepwise turning of the pattern wheel so that the slots of the pattern wheel are successively placed opposite an actuating member which pushes selected jacks into the retracted inoperative position.

A further object of the present invention is to provide a device for setting a pattern wheel with two push buttons, so that depression of one push button effects shifting of the pattern wheel, while depression of the other push button will effect shifting of a jack to its retracted inoperative position.

A further object of the present invention is to connect the push buttons in such a manner that operation of one push button will effect turning of the pattern wheel through an angular distance corresponding to the spacing between two slots, while actuation of the other push button will effect a corresponding stepwise turning of the pattern wheel, and shifting of one jack.

With these objects in view, one embodiment of the present invention is a device for setting selected jacks which are shiftable in slots of a pattern wheel. The device of the present invention comprises a support for supporting the pattern wheel for turning movement about the axis thereof so that the ends of the jacks move along a circular path, first actuating means for turning the pattern wheel step by step through angular distances corresponding to the angular spacing of the jacks, second actuating means shiftable in radial direction between a first position located outwardly of the circular path and a second position located within a slot of the pattern wheel for shifting the respective jack, first operating means for operating the first actuating means so that the pattern wheel is turned step by step for placing the jacks successively opposite the second actuating means, and second operating means for operating the second actuating means to shift selected jacks.

In the preferred embodiment of the present invention, the second operating means are also connected to the first actuating means and first operate the same to turn the pattern wheel one step, before operating the second actuating means to shift the respective jack.

Before the setting operation is carried out, the jacks should be all in the same position, for example, in the operative outwardly advanced position. In accordance with the present invention, a previously set pattern wheel is cleared by a rotatable cam means which successively engages the jacks to shift all jacks to the same position. The jacks are then set to a new pattern, as explained above.

In the preferred embodiment of the present invention, each operating means includes a manually operated push button. When the first push button is depressed it effects turning of the pattern wheel through one step. If this push button is repeatedly operated, the respective jacks are not shifted. The second push button first effects turning of the pattern wheel through one step, and then shifting of the respective jack.

In the preferred embodiment of the present invention the pattern wheel is located in a depressed portion of the support and surrounded by circular shoulder which guides the pattern wheel during turning movement. The actuating means which effect stepwise turning of the pattern wheel include a pointed, rockable arm having a pointed end directly engaging the slots of the pattern wheel and passing through a suitable opening in the circular shoulder of the support.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 5 is a plan view of a cam means for clearing the pattern wheel;

FIG. 6 is an axial sectional view of the clearing cam shown in FIG. 5;

FIG. 7 is a plan view of the setting device supporting a pattern wheel and a clearing cam for the pattern wheel during the clearing operation;

FIG. 10 is a fragmentary sectional view taken on line X—X in FIG. 9; and

FIG. 11 is a sectional view taken on line XI—XI in FIG. 9.

Figure 1:
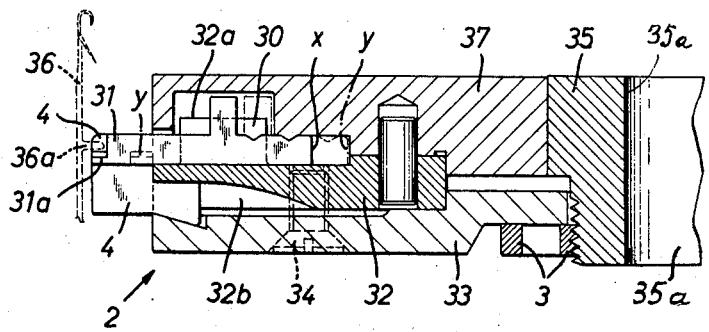
FIG. 1 is a fragmentary axial sectional view of a pattern wheel of the type set by the device of the present invention.
Figure 2:
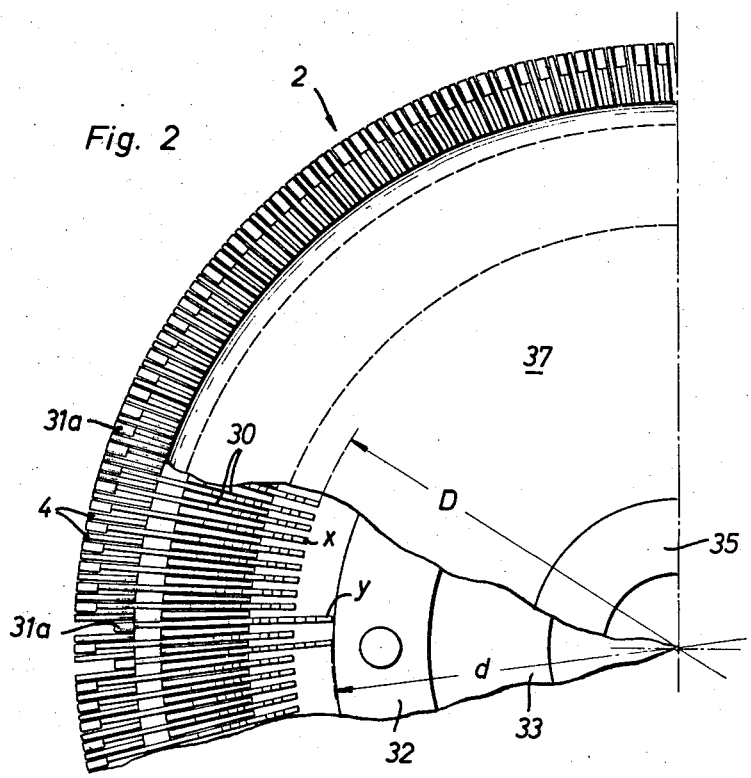
FIG. 2 is a fragmentary plan view of the pattern wheel.

Referring now to the drawings, FIGS. 1 and 2 illustrate a pattern wheel to which the present invention is advantageously applied, but which is not an object of the present invention. The pattern wheel 2 has radial guide slots in an annular wall 30 of a ring-shaped member 32. The periphery of member 32 has radial slots into which plates 4 are inserted. Plates 4 have flaring rear ends which are held in a corresponding recess of a clamping plate 33 held by an annular nut 3 on a thread portion of a hub 35 which is formed with a central bore 35a. A set of jacks 31 is mounted in slots 32a intermediate the plates 4 whose upper edges are located in the same horizontal plane as the upper edges of jacks 31. The outermost end of each jack 31 has a shoulder 31a which is lower than the upper edge of the jack and of the plates 4. FIG. 2 clearly shows that shoulders 31a are provided on laterally projecting parts of the jacks. Shoulders 31a serve to engage in a conventional manner the butts 36a of the cylinder needles 36 for raising the same while the butts 36a are located between two adjacent plates 4, which together form a radial slot in the pattern wheel. The jacks 31 are slidable in guide slots 32a between the advanced operative position x shown in solid lines in FIG. 1 and the inner retracted inoperative position y shown in dash-dot lines. Jacks in the inoperative position will not engage the needles so that by the combination of jacks in operative position and jacks in inoperative position, a selected pattern will be knitted.

The upper edge of each jack has two recesses cooperating with a matching projection on a cover plate 37 which is detachably secured to a hub 35 by means which are not shown in the drawing. When a jack is shifted to its inoperative position y, the projection on the cover plate 37 engages the outer recess in the upper edge of the retracted jack, and holds the same in retracted position during the knitting operation. FIG. 2 shows most of the jacks in the advanced operative position, and two jacks in the lower portion of FIG. 2 in the retracted inoperative position. It will be noted that the periphery of the pattern wheel is formed by plates 4 defining radial slots in which the shiftable jacks 31 are mounted. The inner ends of jacks in operative positions are located on the circle having a diameter D, and the inner ends of jacks in inoperative positions are located on a circle having a diameter d.

Figure 3:
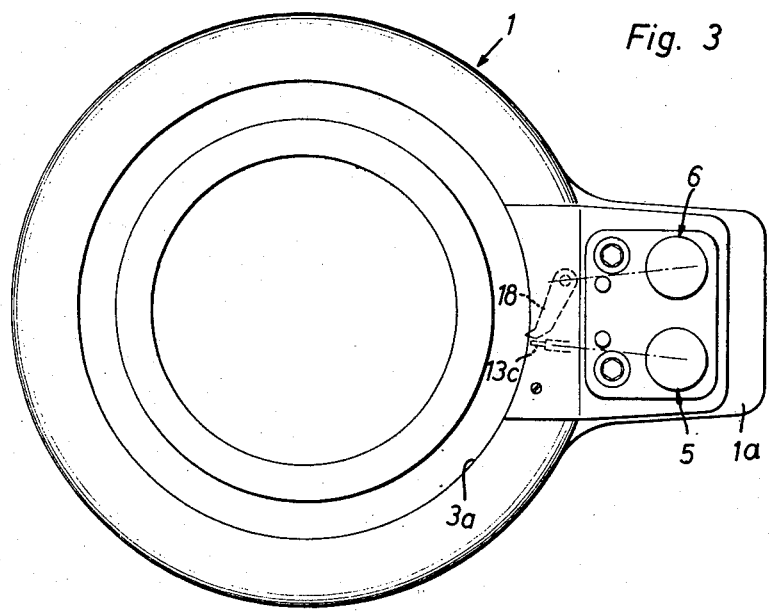
FIG. 3 is a plan view of the setting device of the present invention.
Figure 4:
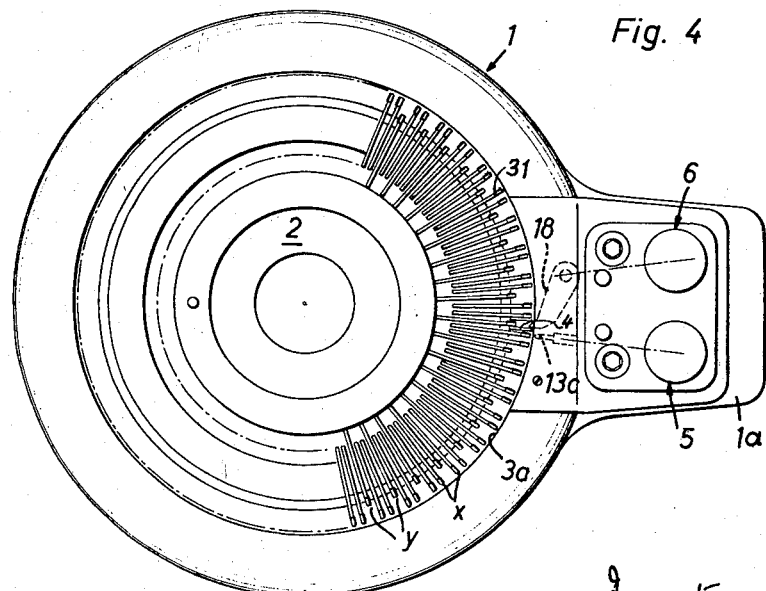
FIG. 4 is a plan view of the setting device of the present invention turnably supporting the pattern wheel.

The device of the present invention has the purpose of shifting selected jacks to arrange the jacks in accordance with a selected pattern. The plan view of FIG. 3 shows a support 1 of generally circular shape which has a projecting support portion 1a. A circular depressed portion is provided on support 1 and is bounded by a circular shoulder 3a whose diameter corresponds to the diameter of the periphery of the pattern wheel 2 formed by the plates 4. Consequently, a pattern wheel 2 can be inserted into the depressed portion of the support and the outer ends of plates 4 will slidably engage the shoulder 3a so that the pattern wheel 2 is turnably supported in support 1 for turning movement about an axis passing through the center of the axial bore 41 of the pattern wheel. This position of the pattern wheel is shown in FIG. 2 in which most plates 4 are omitted for the sake of clarity, and merely indicated by a dash and dot circle directly adjacent the circular shoulder 3a. FIG. 10 also shows the circular shoulder 3a, in sliding engagement with the peripheral surface of the pattern wheel 2 which, as explained above, is formed by the outermost edges of plates 4. It is also apparent from this figure that the circular depression in support 1 has a shape corresponding to the configuration of the bottom surface of the pattern wheel, so that the same can be easily turned. FIG. 4 shows the pattern wheel with the cover plate 37 removed, so that the jacks are fully visible, and it will be noted that some of the jacks are in the inoperative position y, and other jacks are in the operative position x in accordance with the previously selected and set pattern.

For the operation of the device of the present invention, it is necessary that all jacks are in the same position, and consequently, the pattern wheel must be cleared before a new pattern is set. FIGS. 5 and 6 show a device serving this purpose. A central shaft 40 is provided with a roughened surface, and is secured to a circular plate 39 carrying a projecting cam 41. As indicated in FIG. 5, the outermost point of cam 41 will move along a circle having the diameter D, while the circular flange 39a has a diameter d.

Figure 6A:
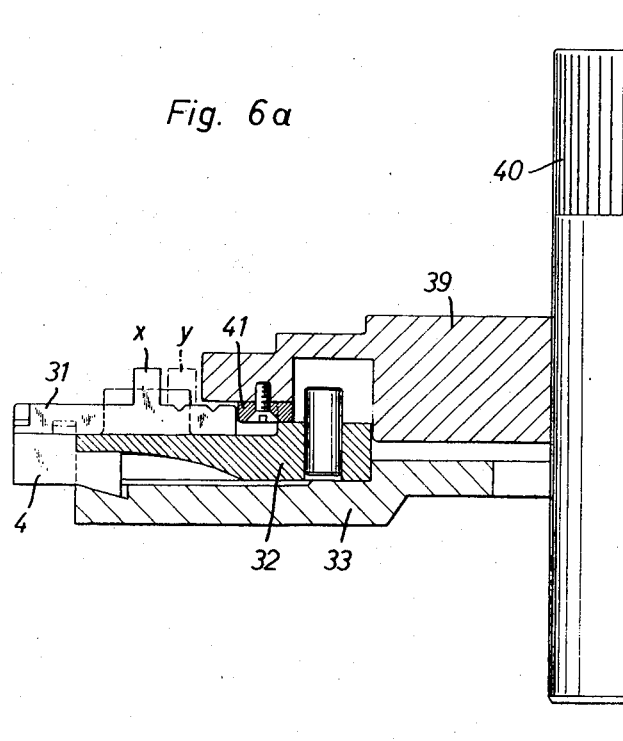
FIG. 6a is a fragmentary axial view illustrating the clearing cam operatively mounted on the pattern wheel and corresponds to radial section taken in FIG. 7.

In order to perform the clearing operation, the pattern wheel is inserted into the circular depression of support 1 with the cover plate 37 removed so that all jacks are freely shiftable. The clearing cam means is placed on top of the other parts of the pattern wheel, and as best seen in FIG. 6a, member 39 has a circular shoulder matching the inner circular shoulder so that the clearing device can be turned relative to the pattern wheel by operation of shaft 40. During such turning movement, cam 41 will successively engage the rear ends of jacks 31 which are in the retracted inoperative position, and will shift the same outwardly to the operative position. FIG. 7 shows how cam 41 turning in clockwise direction has cleared one group of jacks, and is about to clear the following groups of jacks by moving the same from the retracted position to the advanced operative position. After a single revolution of the clearing cam means, all jacks will be in the outer operative position.

The clearing cam means is now removed, and the device of the present invention is used for setting a new pattern by shifting selected jacks from the outer operative position x to the inner inoperative position y. FIGS. 3 and 4 schematically show a push button 6 which operates an arm 18 whose pointed end projects into the slot between two fixed plates 4. When push button 6 is operated, pattern wheel 2 is turned through an angular distance corresponding to the spacing between two jacks 31 or two plates 4. When push button 5 is operated, a thin member 13c is advanced into an opposite slot between two plates 4 to push the respective jack 31 from the outer operative position to the inner inoperative position.

The construction of this arrangement will now be described in detail with reference to FIGS. 8–11. As best seen in FIGS. 9 and 10, first operating means 6 are provided which include a push button having a finger-engaging top portion, and a shaft 6c provided with the flange 6e. Shaft 6c projects into a bore in a sleeve portion 6b which is slidably mounted in a channel in support portion 1a. A spring 7 abuts support portion 1a and a flange 6d of sleeve 6b to urge the sleeve portion 6b into the illustrated position abutting a portion 12a of a coupling plate 12 whose other end abuts a cover member 1g in the position illustrated in FIG. 9. Shaft 6c passes through an opening in coupling plate portion 12a, and also through an opening in bushing 9 which abuts cover part 1g. A spring 8 engages flange 6e and urges the same into engagement with a cover nut 10 which is threaded to bushing 9 whereby the normal position of the push button is determined. Since spring 7 urges sleeve 6b into a position in which the free end of shaft 6c abuts the bottom of the bore in sleeve 6b, depression of the push button will effect downward movement of sleeve 6b, while on the other hand, depression of coupling plate 12 will effect downward movement of sleeve 6b while the push button remains in its normal inoperative position under the action of spring 8 so that sleeve 6b slides on shaft 6c. The lower end of sleeve 6b has a conical cam means 6a.

The second operating means 5 has a push button with a shaft 5c which has a threaded portion passing through a bore in coupling plate 12 and threaded into a corresponding threaded bore in a sleeve portion 5b which has a flange 5d and a conical cam means 5a. A spring 11 abuts urges portion 1a and flange 5d to the normal inoperative position illustrated in FIG. 9 in which coupling plate 12 abuts the top wall of cover member 1b. Sleeve 5b always moves with shaft 5c, and is provided to permit an easier assembly of the parts.

It will be noted that the axial length of the first operating means 6 is greater than the axial length of the second operating means 5.

When the push button of operating means 5 is depressed, coupling plate 12 will move sleeve 6b downwardly, while the push button of operating means 6 remains in its normal position due to the action of spring 8. When the push button of the first operating means 6 is depressed, the sleeve 6b will also move downwardly, but the first operating means 5 will not be actuated, since the opening in portion 12a in coupling plate 12 is sufficiently wide to permit relative movement between shaft 6c and coupling plate 12.

Figure 8:
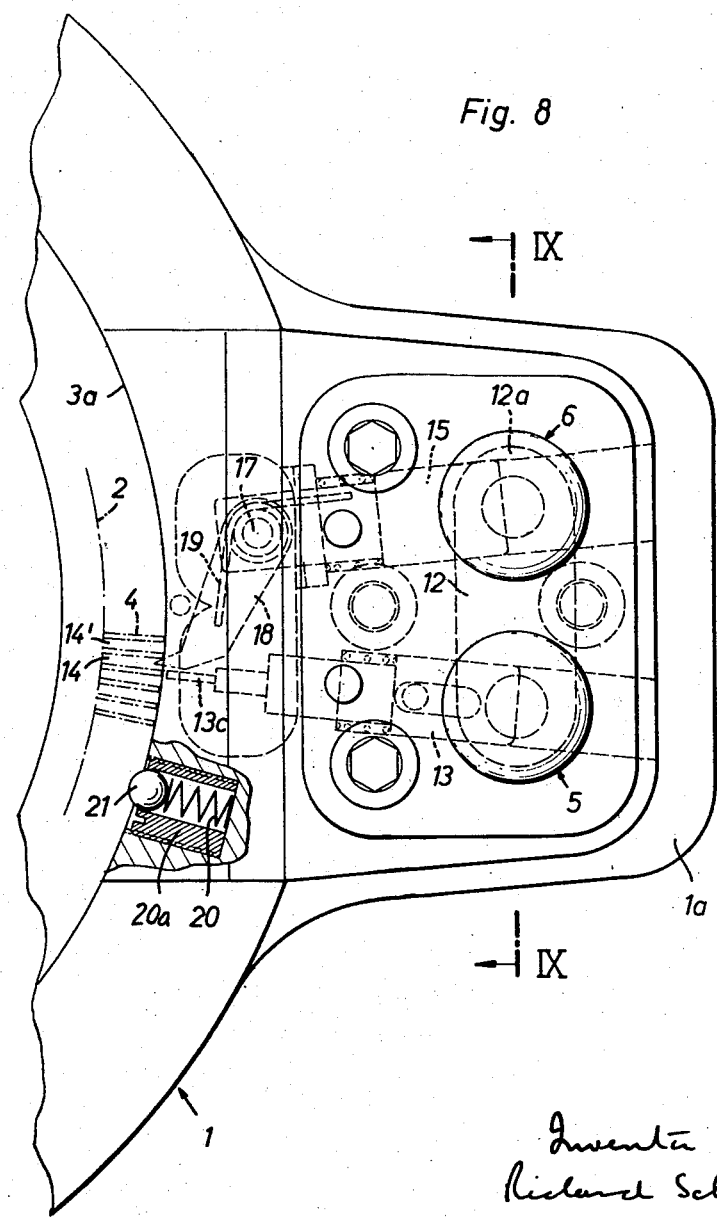
FIG. 8 is a fragmentary plan view on an enlarged scale illustrating the setting means used in the embodiment of FIG. 4.
Figure 9:
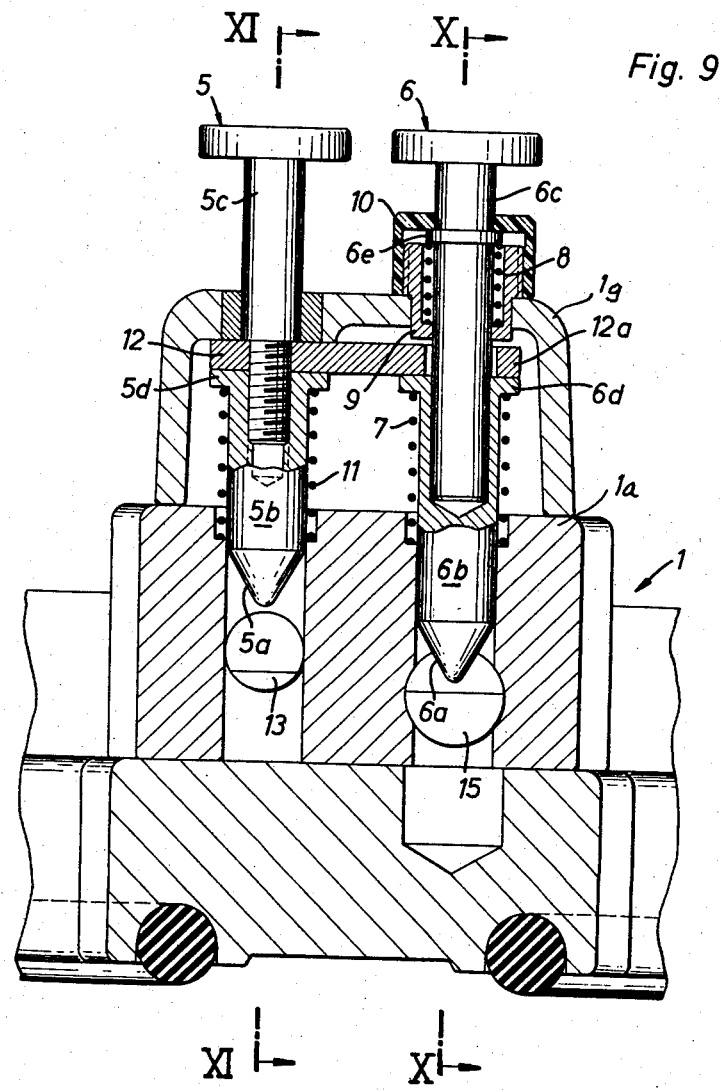
FIG. 9 is a sectional view taken on line IX—IX in FIG. 8.

As best seen in FIGS. 8 and 10, first actuating means are associated with first operating means 6. An actuating member 15 is slidably mounted in a radial bore 1f in support portion 1a, and is urged by a spring 16, abutting a shoulder 15a, into engagement with the conical cam means 6a. The rear end of actuating member 15 has a correspondingly shaped surface 15b matching the conical portion 6a. A pivot pin is secured to the inner end of actuating member 15, and pivotally supports an actuating arm 18 which is spring-loaded by a spring 19 and urged to a position in which its pointed end projects into a slot between two adjacent plates 4 of the pattern wheel.

When sleeve 6b is moved from the higher normal position illustrated in solid lines in FIG. 10 to the position indicated by dash-dot lines, cam portion 6a will effect inward movement of actuating member 15 until the cylindrical portion of sleeve 6b engages the end face 15c of actuating member 15. During such inward movement of actuating member 15 against the action of spring 16 which abuts a fixed ring 1e, arm 18 will rock and shift the pattern wheel one step corresponding to the spacing between two plates 4, or two jacks 31. When sleeve 6b is permitted to return to its initial position under control of spring 7, the rear end face 15b, 15c will be released by cam 6a, and spring 16 will shift actuating member 15 outwardly to the right as viewed in FIG. 10 so that the pointed end of arm 18 first slides on the respective engaged plate 4 until it leaves slot 14, and enters slot 14' under the action of spring 19, as best seen in FIG. 8. This action exerts a slight pressure on the respective engaged plate 4 tending to turn the pattern wheel back in a direction opposite to the shifting direction. To prevent such opposite turning movement of pattern wheel 2, a catch is provided in the circular portion of support 1, and includes a spring 20 urging a ball 21 inwardly into a position limited by a shoulder of a cylindrical member 20a. In this position, ball 21 projects through an opening in the shoulder 3a, and engages a slot 14 between two adjacent plates 4 of the pattern wheel whereby the pattern wheel is arrested in each stepwise shifted position. The spring pressure of the catch means 20, 21 is sufficient to prevent rearward turning of the pattern wheel, but can be overcome by the action of arm 18 when actuating member 15 is inwardly shifted.

The second operating means 5 controls actuating means which are best seen in FIGS. 8 and 11. An actuating member 13 is slidably mounted in a radial bore 1b in support portion 1a, and is urged by a spring 24 engaging a shoulder 13a into the position shown in FIG. 11 where it is stopped by a stop 130. The outer end of actuating member 13 has an inclined face 13b cooperating with the conical cam 5a on sleeve 5b. The inner end of actuating member 13 carries a narrow part 13c, which in the retracted position of actuating member 13 is located outwardly of the circular shoulder 3a and cannot engage the pattern wheel.

In the normal inoperative position of the device, the conical portion 5a is spaced in vertical or axial direction from the actuating member 13, while the conical portion 6a engages the actuating member 15, which is due to the fact that the first operating means 6 is longer than the second operating means 5.

As will become apparent from a comparison of FIGS. 9, 10 and 11, the actuating part 13c is located on a higher level than the actuating arm 18, and the radial bores 1b and 1f are correspondingly staggered as best seen in FIG. 9.

The apparatus operates in the following manner:

When the push button of the second operating means 6 is depressed, conical cam 6a is effective to shift actuating member 15 to effect a turning of the pattern wheel 2 by the arm 18 through a single step. Actuating part 13c remains outwardly retracted and is inoperative. Operating means 6 can be repeatedly operated to shift the pattern wheel through angular distances corresponding to the spacing between two adjacent jacks 31, and the respective jacks remain in the outer operative position in which they were previously placed by operation of the clearing means 39, 40, 41.

When it is desired to shift a jack to its inner inoperative position in accordance with the selected pattern, operating means 5 are actuated. When the respective push button is depressed, conical cam 5a will move from the position illustrated in solid lines in FIG. 11 to the position 5a' engaging the rear face 13b of actuating member 13. This first part of the movement of operating means 5 has no influence on the actuating member 13 and on actuating part 3c. However, as can be clearly seen from FIG. 9, coupling plate 12 will effect downward movement of sleeve 6b so that conical cam 6a will displace actuating means 15 and effect through arm 18 shifting of the pattern wheel through one step so that instead of slot 14, slot 14' is located opposite the actuating part 3c. If the push button of the second operating means 5 is further depressed, conical cam 5a moves from the position 5a' to the position 5a'' and effects during this second half of its movement, shifting of actuating member 13 while actuating part 13c projects into the respective opposite slot between two plates 4 of pattern wheel 4, and shifts the respective jack 31 to its inner inoperative position.

It is therefore apparent that operation of one push button will turn the pattern wheel one step, while the respective jack remains in its operative position. Operation of the other push button, will not only effect turning of the pattern wheel, but also shifting of the respective jack to the inner inoperative position. The setting of the pattern wheel by the device of the present invention is a very simple operation, since the operator depresses one push button, if the pattern requires the jack to be in the operative position, and depresses the the other push button if the pattern requires the respective jack to be in inoperative position.

It will be understood that each of the elements described above, or two or more together, may also find a useful application in other types of pattern wheels differing from the types described above.

While the invention has been illustrated and described as embodied in a setting device for a pattern wheel including two push buttons for selectively setting the jacks of a pattern wheel to operative and inoperative positions, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Device for setting the shiftable jacks of a pattern wheel, comprising, in combination, a support for supporting a pattern wheel for turning movement about the axis thereof so that one set of ends of the jacks of the pattern wheel move along a circular path; first actuating means for turning the pattern wheel step by step through angular distances corresponding to the angular spacing of the jacks; second actuating means shiftable in radial direction to the axis of the pattern wheel between a first position located outwardly of said circular path and a second position located within said path for shifting an oppositely located jack; first operating means for operating said first actuating means so that the pattern wheel is turned one of said angular distances upon operation of said first operating means for placing the jacks successively opposite said second actuating means; and second operating means for operating said second actuating means to move to said second position for shifting selected jacks.

2. Device for setting the shiftable jacks of a pattern wheel, comprising, in combination, a support for supporting a pattern wheel for turning movement about the axis thereof so that one set of ends of the jacks of the pattern wheel move along a circular path; first actuating means for turning the pattern wheel step by step through angular distances corresponding to the angular spacing of the jacks; second actuating means shiftable in radial direction to the axis of the pattern wheel between a first position located outwardly of said circular path and a second position located within said path for shifting an oppositely located jack; first operating means for operating said first actuating means so that the pattern wheel is turned one of said angular distances upon operation of said first operating means for placing the jacks successively opposite said second actuating means; and second operating means operatively connected to said first actuating means and to said second actuating means for first operating said first actuating means to turn the pattern wheel one step to place a jack opposite said second actuating means and for then operating said second actuating means to shift the respective jack.

3. Device for setting the shiftable jacks of a pattern wheel, comprising, in combination, a support for supporting a pattern wheel for turning movement about the axis thereof so that the outer ends of the jacks of the pattern wheel move along a circular path; first actuating means for turning the pattern wheel step by step through angular distances corresponding to the angular spacing of the jacks; second actuating means shiftable in radial direction to the axis of the pattern wheel between a first position located outwardly of said circular path and a second position located within said path for shifting an oppositely located jack inwardly to an inoperative position; first operating means for operating said first actuating means so that the pattern wheel is turned one of said angular distances upon operation of said first operating means for placing the jacks successively opposite said second actuating means; and second operating means for operating said second actuating means to move to said second position for shifting selected jacks inwardly to said inoperative position.

4. Device for setting the shiftable jacks of a pattern wheel, comprising, in combination, a support for supporting a pattern wheel for turning movement about the axis thereof so that the outer ends of the jacks of the pattern wheel move along a circular path; first actuating means for turning the pattern wheel step by step through angular distances corresponding to the angular spacing of the jacks; second actuating means shiftable in radial direction to the axis of the pattern wheel between a first position located outwardly of said circular path and a second position located within said path for shifting an oppositely located jack inwardly to an inoperative position; first operating means for operating said first actuating means so that the pattern wheel is turned one of said angular distances upon operation of said first operating means for placing the jacks successively opposite said second actuating means; and second operating means operatively connected to said first actuating means and to said second actuating means for first operating said first actuating means to turn the pattern wheel one step to place a jack opposite said second actuating means and for then operating said second actuating means to shift the respective jack inwardly to said inoperative position.

5. Device for setting the shiftable jacks of a pattern wheel, comprising, in combination, a support for supporting a pattern wheel for turning movement about the axis thereof; a cam means detachably located on said support for turning movement about said axis to place one set of ends of the jacks on a circle so that after removal of said cam means the ends of the jacks move along a circular path during turning movement of the pattern wheel; first actuating means for turning the pattern wheel step by step through angular distances corresponding to the angular spacing of the jacks; second actuating means shiftable in radial direction to the axis of the pattern wheel between a first position located outwardly of said circular path and a second position located within said path for shifting an oppositely located jack inwardly to an inoperative position; first operating means for operating said first actuating means so that the pattern wheel is turned one of said angular distances upon operation of said first operating means for placing the jacks successively opposite said second actuating means; and second operating means for operating said second actuating means to move to said second position for shifting selected jacks inwardly to said inoperative position.

6. Device for setting the shiftable jacks of a pattern wheel, comprising, in combination, a support for supporting a pattern wheel for turning movement about the axis thereof; a cam means detachably located on said support for turning movement about said axis so as to place one set of ends of the jacks on a circle so that after removal of said cam means the ends of the jacks move along a circular path during turning movement of the pattern wheel; first actuating means for turning the pattern wheel step by step through angular distances corresponding to the angular spacing of the jacks; second actuating means shiftable in radial direction to the axis of the pattern wheel between a first position located outwardly of said circular path and a second position located within said path for shifting an oppositely located jack; first operating means for operating said first actuating means so that the pattern wheel is turned one of said angular distances upon operation of said first operating means for placing the jacks successively opposite said second actuating means; and second operating means operatively connected to said first actuating means and to said second actuating means for first operating said first actuating means to turn the pattern wheel one step to place a jack opposite said second actuating means and for then operating said second actuating means to shift the respective jack.

7. Device for setting the shiftable jacks of a pattern wheel, comprising, in combination, a support for supporting a pattern wheel for turning movement about the axis thereof; a cam means detachably located on said support for turning movement about said axis so as to place the ends of the jacks on circles so that after removal of said cam means the outer ends of the jacks move along a circular path during turning movement of the pattern wheel; first actuating means for turning the pattern wheel step by step through angular distances corresponding to the angular spacing of the jacks; second actuating means shiftable in radial direction to the axis of the pattern wheel between a first position located outwardly of said circular path and a second position located within said path for shifting an oppositely located jack inwardly to an inoperative position; first operating means for operating said first actuating means so that the pattern wheel is turned one of said angular distances upon operation of said first operating means for placing the jacks successively opposite said second actuating means; and second operating means for operating said second actuating means to move to said second position for shifting selected jacks inwardly to said inoperative position.

8. Device for setting the shiftable jacks of a pattern wheel, comprising, in combination, a support for supporting a pattern wheel for turning movement about the axis thereof; a cam means detachably located on said support for turning movement about said axis so as to place the ends of the jacks on circles so that after removal of said cam means the outer ends of the jacks move along a circular path during turning movement of the pattern wheel; first actuating means for turning the pattern wheel step by step through angular distances corresponding to the angular spacing of the jacks; second actuating means shiftable in radial direction to the axis of the pattern wheel between a first position located outwardly of said circular path and a second position located within said path for shifting an oppositely located jack inwardly to an inoperative position; first operating means for operating said first actuating means so that the pattern wheel is turned one of said angular distances upon operation of said first operating means for placing the jacks successively opposite said second actuating means; and second operating means operatively connected to said first actuating means and to said second actuating means for first operating said first actuating means to turn the pattern wheel one step to place a jack opposite said second actuating means and for then operating said second actuating means to shift the respective jack inwardly to said inoperative position.

9. Device for setting the jacks of a pattern wheel, comprising, in combination, a support for supporting a pattern wheel for turning movement about the axis thereof so that the aligned ends of the jacks of the pattern wheel move along circular paths; first actuating means mounted on said support cooperating with the slots of the pattern wheel for turning the same step by step through angular distances corresponding to the angular spacing of the jacks; second actuating means mounted on said support shiftable in radial direction to the axis of the pattern wheel between a first position located outwardly of the outer circular path and a second position located within an oppositely located slot of the pattern wheel for shifting the respective jack inwardly to an inoperative position; first operating means movable through a first distance and being operatively connected to said first actuating means to operate the same when moving through said first distance so that the pattern wheel is turned one of said angular distances for placing a jack opposite said second actuating means; and second operating means movable through a second distance longer than said first distance and being operatively connected to said first operating means to move the same said first distance during the first part of the movement through said second distance so that said first actuating means turns the pattern wheel one step, said second manually operated means being operatively connected to said second actuating means for operating the same during the second part of the movement thereof through said second distance so that said second actuating means shifts the respective opposite jack inwardly to said inoperative position.

10. Device for setting the jacks of a pattern wheel, comprising, in combination, a support for supporting a pattern wheel for turning movement about the axis thereof so that the aligned ends of the jacks of the pattern wheel move along circular paths; first actuating means mounted on said support cooperating with the slots of the pattern wheel for turning the same step by step through angular distances corresponding to the angular spacing of the jacks; second actuating means mounted on said support shiftable in radial direction to the axis of the pattern wheel between a first position located outwardly of the outer circular path and a second position located within an oppositely located slot of the pattern wheel for shifting the respective jack inwardly to an inoperative position; first operating means including a manually operated push-button member, and an operating member movable through a first distance in one direction, said operating member being operatively connected to said first actuating means to operate the same when moving through said first distance, said operating member being movable independently of said manually operated push-button member in said one direction, and spring means urging said operating member in the opposite direction into engagement with said manually operated push-button member; and second operating means movable through a second distance longer than said first distance and being coupled to said operating member to move the same said first distance during the first part of the movement through said second distance so that said first actuating means turns the pattern wheel one step, said second manually operated means being operatively connected to said second actuating means for operating the same during the second part of the movement thereof through said second distance so that said second actuating means shifts the respective opposite jack inwardly to said inoperative position.

11. A device as set forth in claim 10 wherein said operating means are mounted on said support for movement parallel to said axis, wherein said operating member has a sleeve portion surrounding a portion of said push-button member and being slidable thereon; and a coupling member secured to said second operating means and abutting said slidable sleeve portion for moving the same during the movement of said second operating means.

12. Device for setting shiftable jacks of a pattern wheel, comprising, in combination, a support for supporting a pattern wheel for turning movement about the axis thereof so that the aligned ends of the jacks of the pattern wheel move along circular paths, said support being substantially circular and having an outwardly projecting support portion, said support portion having a first radial bore and a second radial bore, a first axially extending channel opening into said first radial bore and a second axially extending channel opening into said second radial bore; a first actuating member slidably mounted in said first radial bore, a spring-loaded arm rockably mounted on the inner end of said first actuating member and having a free pointed end for engaging the slots of the pattern wheel for turning the same step by step through angular distances corresponding to the angular spacing of the jacks during each inward movement of said first actuating member; a first operating means including a spring-loaded sleeve mounted in said first channel and having a cam means at the end thereof cooperating with the outer end of said first actuating member for shifting the same, and a first push-button member having a shaft slidably projecting into said sleeve for moving said sleeve to actuate said first actuating means during movement through a first distance; a second actuating member mounted in said second bore and having a narrow inner end part movable to a position located within a slot of the pattern wheel for shifting the respective jack; second operating means having a cam means at the end thereof cooperating with the outer end of said second actuating member for shifting the same, and a second push-button member, said second operating means being movable through a distance greater than said first distance; and a coupling member secured to said second operating means and having a portion abutting said sleeve so that said sleeve moves with said second operating means through said first distance to effect shifting of the pattern wheel, whereupon said second operating means moves further to operate said second actuating member to shift the respective jack.

13. A device as set forth in claim 12 wherein said cam means are conical portions, and wherein the outer ends of said actuating members have inclined faces cooperating with and matching said conical portions.

14. A device as set forth in claim 12 wherein said coupling member is a plate having an opening through which said shaft of said first push-button member passes.

15. A device as set forth in claim 12 wherein said second operating means includes a spring-loaded sleeve having said cam means, and being threadedly secured to said second push-button member.

16. A device as set forth in claim 12 and including a spring abutting said support portion and first push-button member to hold the latter during movement of said sleeve; and wherein said sleeve is spring-loaded for holding said sleeve in a position axially abutting said shaft.

17. A device as set forth in claim 12 and including springs for urging said actuating members against the respective cam means and abutting said support portion.

18. A device as set forth in claim 12 wherein said support has a depressed circular portion for turnably supporting the pattern wheel and being surrounded by a circular shoulder, said radial bores opening on said circular shoulder.

19. A device as set forth in claim 18 and including a spring-loaded catch located in said support and projecting inwardly from said circular shoulder so as to engage successive slots of the pattern wheel when the same is turned step by step by said arm.

20. A device as set forth in claim 12 wherein said push-button members are located adjacent each other; wherein said first radial bore is staggered in axial direction relative to said second radial bore; and wherein said first operating means is longer in axial direction than said second operating means.

References Cited in the file of this patent

UNITED STATES PATENTS

| 1,678,319 | Blessing | July 24, 1928 |

FOREIGN PATENTS

| 218,848 | Great Britain | July 17, 1924 |
| 315,592 | Great Britain | July 18, 1929 |